United States Patent [19]

Bolton et al.

[11] B 4,000,796

[45] Jan. 4, 1977

[54] BRAKING DEVICE

[75] Inventors: Frederick Arthur Bolton, Hamilton; James Louis Eckebrecht, Burlington, both of Canada

[73] Assignee: Arcan Eastern Limited, Hamilton, Canada

[22] Filed: May 23, 1975

[21] Appl. No.: 580,379

[44] Published under the second Trial Voluntary Protest Program on April 6, 1976 as document No. B 580,379.

[52] U.S. Cl. .............................. 193/35 A; 188/80; 188/262; 193/37
[51] Int. Cl.² .................. B65G 13/00; B65G 39/00
[58] Field of Search ................ 193/35 R, 35 A, 40, 193/32, 37; 198/127 R; 188/25, 39, 80, 262

[56] References Cited

UNITED STATES PATENTS

| 2,390,785 | 12/1945 | Eppler | 193/35 A |
| 3,314,514 | 4/1967 | Hundhausen et al. | 193/35 A |
| 3,321,057 | 5/1967 | De Good | 193/35 A |

*Primary Examiner*—Evon C. Blunk
*Assistant Examiner*—James L. Rowland
*Attorney, Agent, or Firm*—Arne I. Fors

[57] ABSTRACT

A braking device for retarding and controlling the speed of moving objects such as cartons, pallets and the like, travelling down an inclined roller conveyor system. The device comprises a primary roll journalled in a housing and having a peripheral surface actuable by a said moving object and a secondary roll journalled within the housing actuable by the primary roll. The secondary roll is loosely journalled in a bracket pivotally mounted on an axle coaxial with the primary roll and is biased by an adjustable pressure plate having a bevelled portion at one end to an at-rest position in proximity to the primary roll. Rotation of the primary roll under the weight of an object travelling thereon rotates the secondary roll by frictional interengagement against the bias of the pressure plate whereby the secondary roll becomes wedged between said primary roll and the pressure plate bevelled portion for retarding the rotation of the primary roll.

13 Claims, 7 Drawing Figures

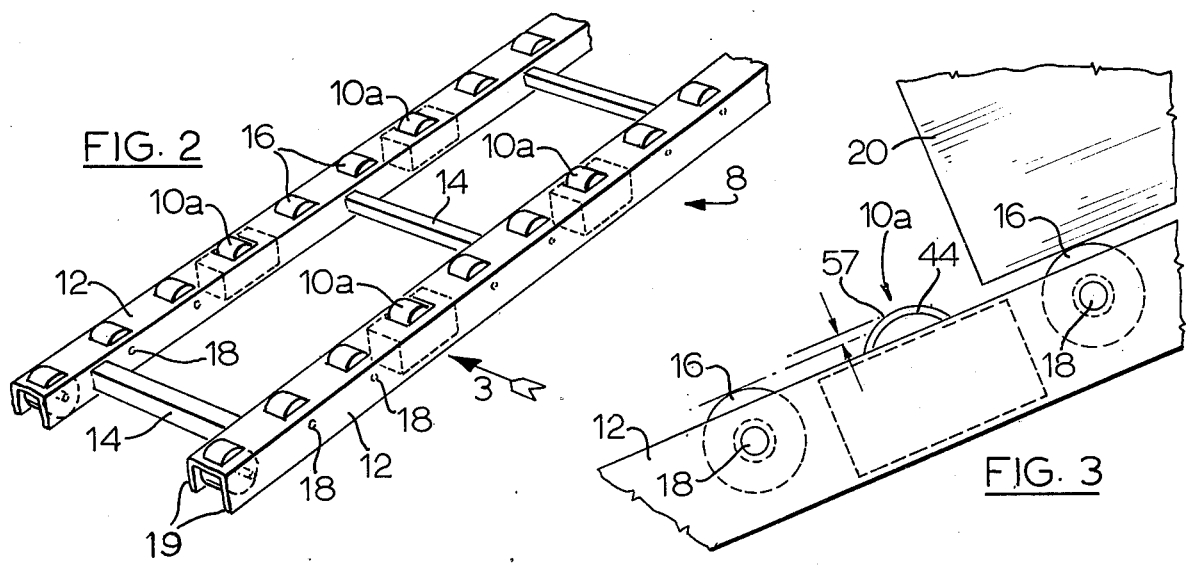
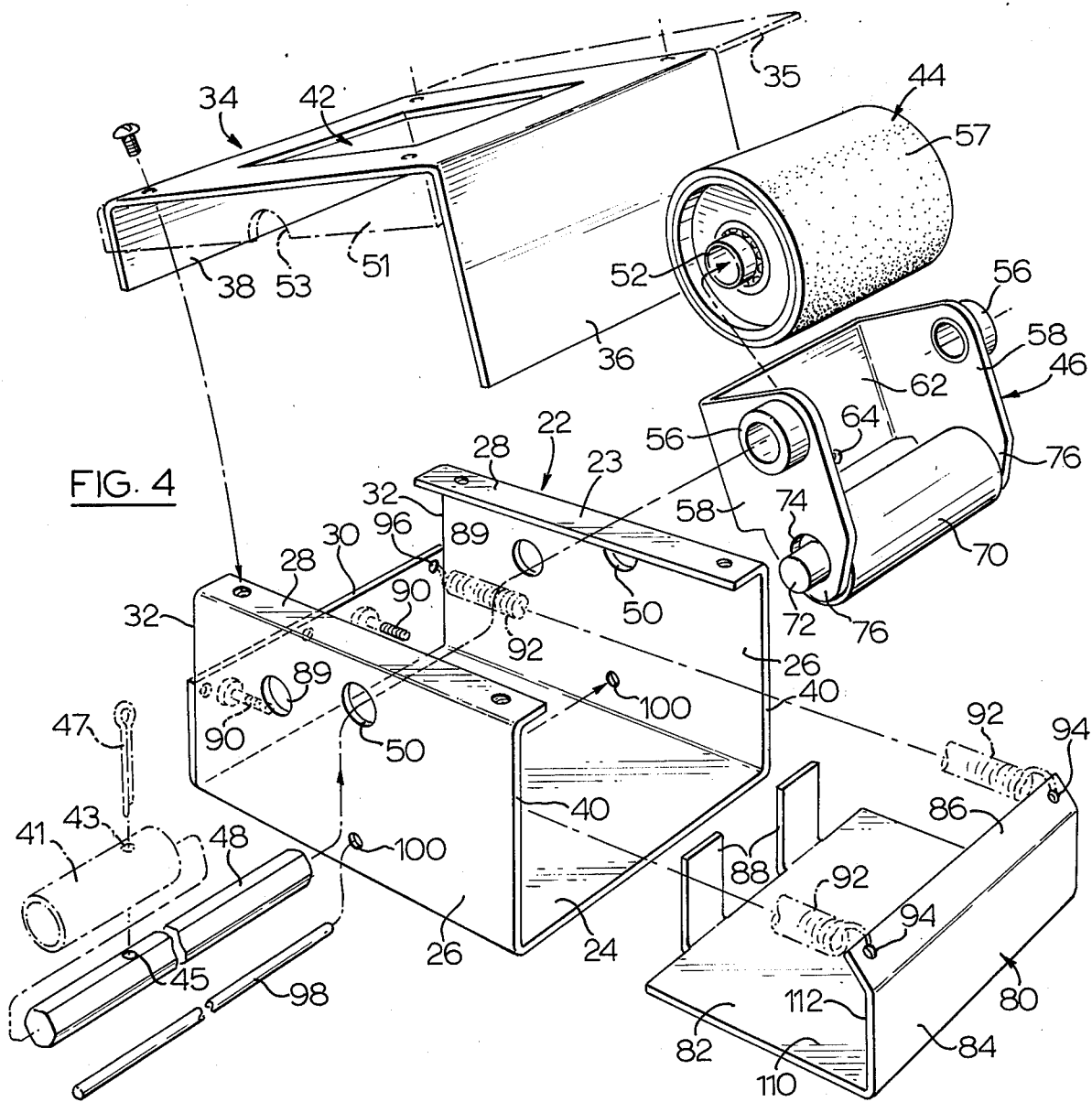

BRAKING DEVICE

BACKGROUND OF THE INVENTION

This invention relates to a braking or retarding device for slowing down and controlling the speed of moving objects such as cartons, pallets and the like travelling on a roller conveyor system. More particularly, the invention relates to a simplified braking or retarding device for conveyors which obviates the need for complex mechanical or electro-mechanical mechanisms commonly known in the prior art.

The use of inclined conveyors using feely rotatable wheels or rollers for the travel of pallets and the like objects thereon by the use of gravity is well known. A gradient such as 1.5° has been found satisfactory to overcome friction and to permit the free flow of pallets on conveyors, but such a slope can result in continued acceleration of the pallets along the conveyors and, if the travel of the pallets is not retarded and controlled, the forward velocity of the pallets can unduly increase resulting in collisions and damage both to pallets and their contents with possible danger to workmen and other personnel.

A number of speed retarders for gravity conveyors have been designed in an effort to overcome the problems inherent in this type of flow conveyor. For example, U.S. Pat. No. 3,321,057 discloses a retarder for gravity conveyors comprising inter alia a retarder roller adapted to engage a brake pad which is disposed in a positive braking position by a solenoid-actuated latch in electrical communication with a timer. Upon depression of the retarder roller, the timer is actuated releasing the roller brake upon expiration of a timed interval; thus sequentially controlling a plurality of articles travelling on the gravity conveyor. This apparatus requires the use of an electrically operated timing device and does not permit actuation and release of the retarder roller upon removal of a particular article from the gravity conveyor.

U.S. Pat. No. 1,425,599 teaches a gravity conveyor having retarding means for maintaining an interval of space between articles passing over the said conveyor to prevent collision of articles transported. The structure comprises a retarding device actuated by an article passing thereover whereby a plurality of brake shoes engages a corresponding number of retarding rollers upon actuation of a hinged conveyor section. However, the structure is complex in design and expensive to manufacture.

STATEMENT OF INVENTION

It is a principal object of the present invention to overcome the problems inherent in known retarding mechanisms and to provide a reliable retarding or braking device which is simple in construction, inexpensive to manufacture and versatile in its application.

It is another object of the present invention to provide a braking or retarding device which can be readily installed or removed from a conveyor system as desired to accommodate moving objects of various dimensions and weights.

In general, my invention comprises a novel braking device for use in a conveyor frame having an inclined conveying surface along which pallets travel, a braking device being mounted at linear spaced intervals therealong. Each braking device comprises, in combination, a housing, a primary roll journalled within said housing having a peripheral surface projecting from said housing adapted to be frictionally engaged by said moving object for rotation of said roll thereby, a secondary roll, means journalling said secondary roll within said housing and means normally biasing said secondary roll journal means in a direction opposite to normal direction of rotation of said primary roll, a pressure plate slidably mounted within said housing for reciprocal travel towards and away from the peripheral surface of said primary roll, means for biasing said pressure plate against said secondary roll in a direction opposite to the normal direction of rotation of said primary roll, said pressure plate having a bevelled surface adapted to receive said secondary roll in wedging engagement between said pressure plate and said primary roll, whereby rotation of said primary roll in the direction of travel under the weight of an object thereon rotates said secondary roll in the opposite direction for frictional engagement with said pressure plate bevelled surface and wedging of the secondary roll between said primary roll and said pressure plate bevelled surface for retarding the rotation of said primary roll.

BRIEF DESCRIPTION OF THE DRAWINGS

The foregoing objects of the invention and the manner in which they can be attained will become apparent from the following detailed description of the specific embodiments, read in conjunction with the accompanying drawings, in which:

FIG. 2 is a perspective view of another roll conveyor incorporating a second embodiment of the device of the present invention;

FIG. 3 is a side elevation, taken at the point indicated by numeral 3 in FIG. 2;

FIG. 4 is an exploded perspective view of the device of the present invention showing the structural configuration of component parts of the invention, the embodiment of FIG. 2 by solid lines and the embodiment of FIG. 1 with added ghost lines;

Like reference characters refer to like parts throughout the description of the drawings.

DESCRIPTION OF THE PREFERRED EMBODIMENTS

Figure 1:
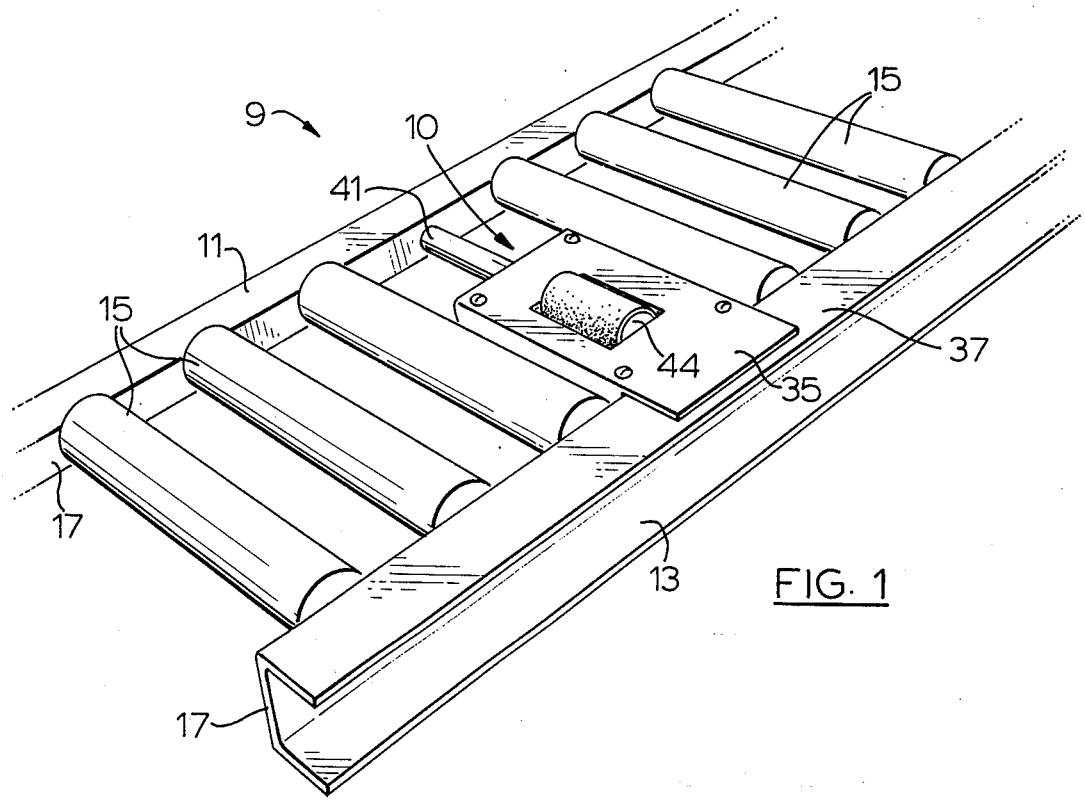
FIG. 1 is a perspective view of a roll conveyor incorporating an embodiment of the device of the present invention.
Figure 5:
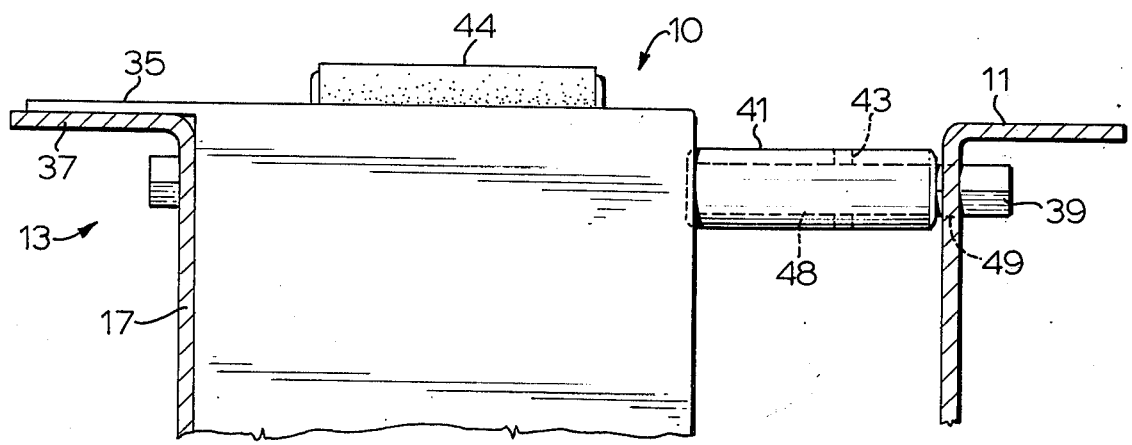
FIG. 5 is a transverse section of the mounting arrangement of the embodiment shown in FIG. 1.

With reference first to FIG. 1, a retarding device 10 of the present invention is shown mounted between a pair of spaced longitudinal channel members 11, 13 in series with a plurality of rollers 15 journalled in channel webs 17. FIG. 2 illustrates a second embodiment of the retarder of the invention wherein a plurality of retarding devices 10a are shown mounted at spaced longitudinal intervals in each of parallel inverted U-shaped channels 12 rigidly secured together a spaced distance apart by reinforcing tubular members 14 welded thereto. Interposed between adjacent retarding devices 10 in a channel 12 are wheel rollers 16 mounted on shafts 18 journalled in and extending between the flanges 20 of each channel 12.

Figure 6:
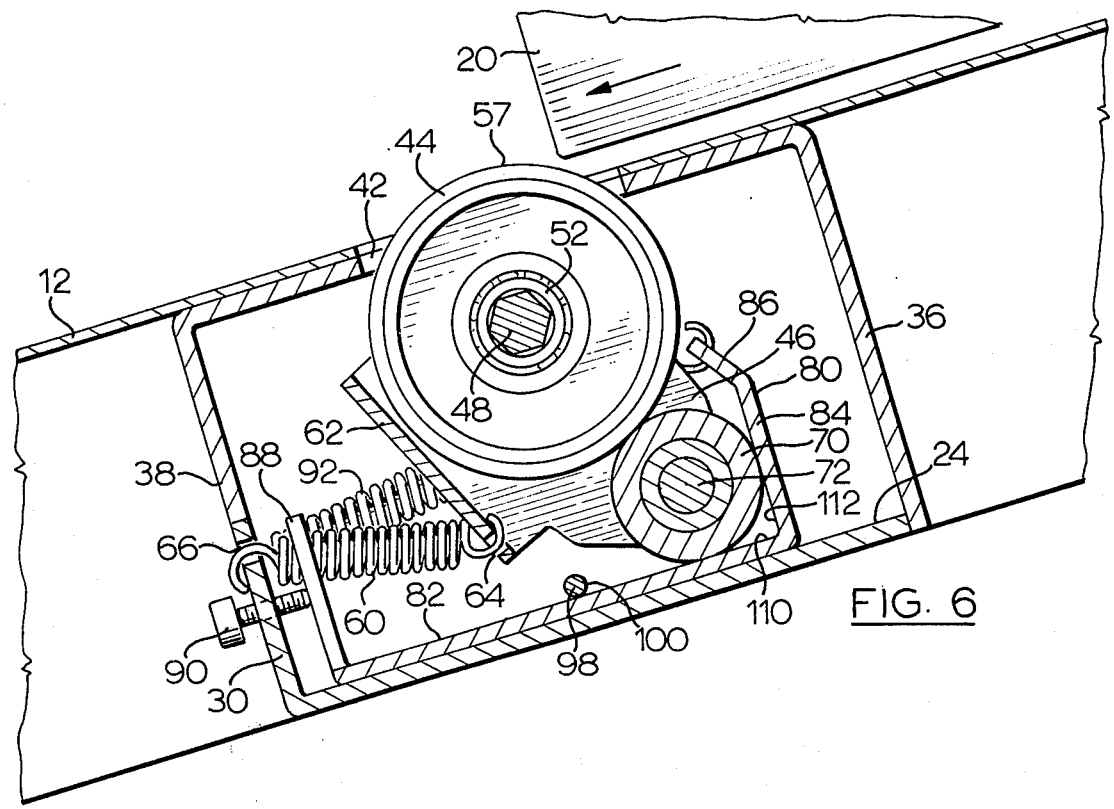
FIG. 6 is a longitudinal section of the structure of the present invention in its inoperative position preparatory to receiving an object travelling down an inclined conveyor.
Figure 7:
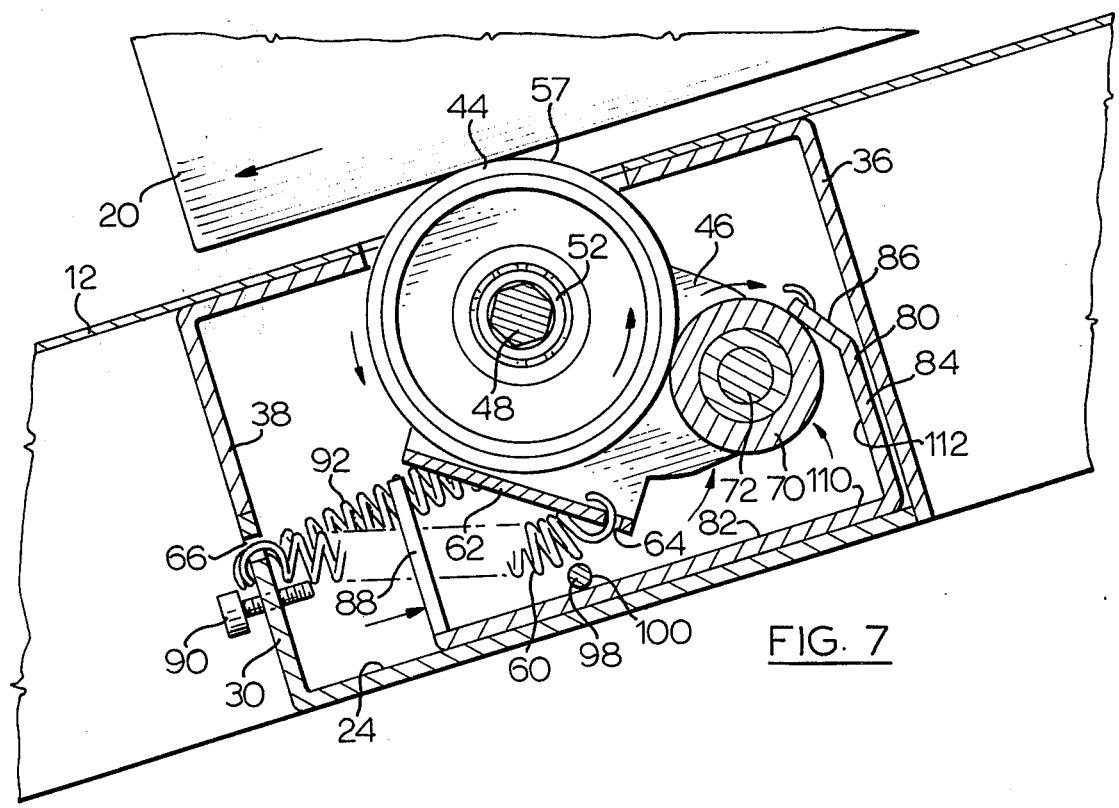
FIG. 7 is a longitudinal sectional view corresponding to FIG. 6 in which the retarding device is actuated to its positive retarding position by a load thereon.

The fragmentary sections of conveyors 8 and 9 portrayed in FIGS. 1 and 2 represent a portion only of much longer, gravitationally-actuated conveyor systems for moving articles such as loaded cartons, pallets and the like designated by numeral 20 in FIGS. 2, 6 and 7.

The retarding devices are shown, in FIG. 2, installed in every fourth location. It will be understood that the retarding devices could be installed in every location adjacent each other or installed in every second or third location, as exemplified by the embodiment of FIG. 1, to accommodate various lengths and weights of articles passing thereover. The number and spacing of the braking devices will depend therefore upon the particular installation, taking into account such variables as the weight and bulk of the moving articles on the conveyor, the fragility of the moving objects, the incline of the conveyor, and the retarding or braking forces available from each retarding device.

It will be understood that the two embodiments of retarding devices 10 and 10a differ only in housing configurations and mounting assemblies.

With particular reference now to FIG. 4 through 7, in which the retarding device of the invention is shown in detail, each braking device 10, 10a comprises a housing 22 consisting of a mounting bracket 23 formed of sheet steel having a base 24, upright sidewalls 26 depending therefrom and inwardly turned upper flanges 28. A rear wall 30 extending from base 24 is bent through 90° to abut the rearward edges 32 of sidewalls 26. A cover plate 34 having a front wall 36 and a rear wall 38 depending downwardly therefrom adapted to overlie the front and rear edges 40, 32 of mounting bracket 23 fully encloses the housing contents. A rectangular opening 42 cut out in the top of cover 34 is centrally disposed to permit primary roll 44 to partially extend therethrough.

It will be understood that channels 12 can be upright with web 13 facing downwardly, or on their sides with webs 17 facing inwardly, as shown in FIG. 1. The cover plate 34 would then have a lateral flange 35 to overlie flange 37 of channel 13 to prevent pivotal movement of the housing on shaft 39 mounted in and extending between webs 17 of channel members 11, 13. A spacer sleeve 41 having an aperture 43 for alignment with aperture 45 in shaft 48 receives cotter pin 47 to positively position sleeve 41 and retarder 10 between said channel members 11, 13. The length of shaft 48 will vary as to the mode of installation; to extend between channel members 11, 13 or between flanges 20 of each channel 12, as will become evident as the description proceeds.

In the embodiment of FIG. 1, cover plate 34 preferably has a down-turned flange 51 with notch 53 which abuts on sleeve 43.

Primary roll 44 is journalled for rotation within mounting bracket 23 by hexagonal bar shaft 48 mounted in aligned openings 50 formed in the sidewalls 26 of the housing. Roll 44 preferably has the same outside diameter as idler rolls 16 and is loosely bearing mounted on a sleeve 52 which in turn is mounted on bar shaft 48. The cylindrical surface of primary roll 44 preferably is coated with urethane for reasons which will become apparent as the description proceeds.

Roll bracket 46, pivotally mounted on hexagonal bar shaft 48, has spacers 56 adjacent each sidewall 58 to centrally dispose said roll bracket between the sidewalls 26 of mounting bracket 23 and to position primary roll 44 in opening 42 in cover plate 34. A tension spring 60, shown most clearly in FIGS. 6 and 7, engages the lower portion of rear wall 62 of the roll bracket at the aperture indicated by numeral 64 and engages, at its opposite end, rear wall 30 of housing 22 at aperture 66. Spring 60 thus pivots roll bracket 46 in a downwardly, clockwise direction, as viewed in FIGS. 4, 6 and 7; opposite to the direction of rotation of primary roll 44.

A secondary roll 70, having an axial shaft 72, is journalled for rotation in oversized apertures 74 formed in the lower projections 76 of sidewalls 58 of roll bracket 46 such that secondary roll 70 can pivot loosely about the periphery of primary roll 44 into and out of abutment with the said primary roll. The cylindrical surface of secondary roll 70 is preferably coated with urethane.

Pressure plate 80 having a base 82 adapted for slidable movement on base 24 of housing 22 has an upwardly depending forward end wall 84 terminating in an upper rearwardly bevelled portion 86. A pair of upwardly depending detents 88 formed at the rearward edge of pressure plate 80 are adapted to abut the pair of set screws 90 threaded into rear wall 30 of housing 22 for positioning pressure plate 80 in the position indicated in FIG. 6, under the bias of tension springs 92 urging the said pressure plate rearwardly to the left as shown in the drawings, such that secondary roll 70 is loosely journalled to almost abut, or loosely abut, primary roll 44 to permit primary roll 44 to rotate independent of secondary roll 70 under no-load conditions or during slow rotation of roll 44. Tension springs 92 engage apertures 94 in the bevelled upper portion 86 of wall 84 of the pressure plate and engage apertures 96 formed in the upper portion of rearward wall 30 of the mounting bracket 23.

A retaining rod 98 mounted in apertures 100 formed in the sidwalls 26 of mounting bracket 23 maintains base 82 of the said pressure plate 80 in abutment against base 24 of mounting bracket 23.

To install the retarding device 10 as shown in FIG. 1 in a conveyor system, a pair of rollers 15 are removed and hexagonal shaft 48 having spacer sleeve 41 thereon is inserted in an opening 49 in channel web 17 by sliding said shaft axially within housing 22 to one side, seating flange 35 on flange 37 of channel 13, and returning shaft 48 to its central operative position whereby each end is seated in a channel web 17. Cotter pin 47 is inserted through apertures 43, 45 to lock shaft 48 and retarder 10 in the operative position.

A pair of retarders 10 can be installed side-by-side between channel members 11, 13 by securing housings 22 together by use of a bolt, not shown, extending through wall apertures 89. Shaft 48 would be common to both retarders and a spacer sleeve 41 not required for retarder embodiment 10a.

The retarding device 10a of FIG. 2 is mounted in inverted channel 12 by hexagonal bar shaft 48 extending through apertures 50 formed in the sidewalls 26 of housing 22. The retarding device 10a can be readily installed in any of the shaft openings provided for idler rolls 16 by the simple expedient of locating housing 22 in the desired position and inserting the said bar shaft 48 through apertures 21 of the channel sidewalls 20, apertures 50 of the mounting bracket sidewalls 26, through the apertures provided in the roll bracket 46, and through primary roll 44.

In operation, primary roll 44, shown most clearly in FIGS. 3, 6 and 7, having cylindrical surface 57 extending slightly above the upper plane of idler rolls 16, is depressed downwardly slightly, as permitted by the bearing clearance under the weight of the article passing thereover, such that the primary roll 44 bears upon secondary roll 70 held in position by pressure plate 80 and the urethane coated exterior cylindrical surface of the primary roll abuts and frictionally engages the urethane coated exterior surface of secondary roll 70. Primary roll 44 is rotated in a counterclockwise direction and secondary roll 70 is rotated, as shown most clearly in FIG. 7, in a clockwise direction. The surface of the secondary roll engages knurled inner surfaces 110, 112 formed on the included surfaces of base 82 and vertical forward end wall 84 of the pressure plate such that secondary roll 70 climbs knurled surface 112 upwardly to the right to be wedged between inwardly bevelled portion 86 of the pressure plate and primary roll 44. Roll bracket 80 pivots in a counterclockwise direction and pressure plate 82 is extended to the right, as viewed in FIG. 7, against the bias of their respective tension springs as secondary roll 70 is actuated.

The wedging of secondary roll 70 jams it to effectively retard rotation of the primary roll 44 by frictional engagement between primary roll 44 and secondary roll 70. As the travel of article 20 thus is retarded and the rotation of primary roll 44 and secondary roll 70 are slowed due to the friction created therebetween, the force of the wedging action imposed on secondary roll 70 is reduced and the bias of spring 60 connected to roll bracket 46 and of springs 92 connected to pressure plate 80 retracts secondary roll 70 from its wedged position. In that the secondary roll is loosely journalled in bracket 46, the secondary roll loosely pivots about primary roll 44 to return to the position shown in FIG. 6, freeing the primary roll 44 from restraint. Retaining rod 98 maintains pressure plate 80 against base 82 of mounting bracket 23 as it reciprocates across the base 82 such that the desired clearance or lack of friction required between the primary and secondary rolls is provided during recycling of the secondary roll, mounting bracket 23 and pressure plate 80. Renewed acceleration of primary roll 44 under continued load conditions repeats the retarding sequence as just described to provide a cyclic braking action, which effectively controls the speed of travel of objects on the conveyor.

The hardness, or resiliency, of the roll surfaces, the angle of nip defined between the primary roll and pressure plate bevelled portion 86, which in turn is a function of relative cylinder diameters and the angle of bevelled portion 86, in addition to the forces exerted indirectly by the springs 60, 92 on secondary roll 70, are important in permitting continuous but retarded travel of articles along the conveyors. An embodiment of retarder fabricated and successfully tested will now be generally described.

Housing 22, cover plate 34, roll bracket 46 and pressure plate 80 were fabricated from steel sheet of 2.75 mm. thickness. The retarder had outside dimensions of 10 × 11.4 × 6.5 cm. and contained a primary roll 44 of 5.3 cm. diameter and 5.1 cm. length. Secondary roll 70 had a diameter of 2.6 cm. and a length of 6.5 cm. The cylindrical surfaces of primary roll 44 and secondary roll 70 were coated with urethane having a durometer measurement of between 60 and 80. Pressure plate 80 was 8.3 cm. long, 8.9 cm. wide and the rearwardly bevelled portion 86 thereof, having a height of 3.9 cm., subtended an angle of 35° to the plane of end wall 84, which provide a nip angle of about 70° between the tangent of the intersection of the primary and secondary rolls and plane of the bevelled portion 86 when the pressure plate 80 was extended to its operative retarding position. The tension of springs 60 and 92 was selected to enable the secondary roll bracket 46 and pressure plate 84 to pivot and extend respectively as shown in FIG. 7 under load conditions and to retract as shown in FIG. 6 under no load and slow speed conditions.

The present invention provides a number of important advantages. Braking devices can be readily mounted in conventional inclined roller conveyor systems as required according to the weight and size of articles conveyed to control the speed of travel of the articles. The braking devices are simple in construction and operation and thus obviate the need for relatively complex mechanical and electo-mechanical braking devices.

What we claim as new and desire to protect by Letters Patent of the United States is:

1. A braking device for retarding moving objects comprising, in combination: a housing, a primary roll journalled within said housing having a peripheral surface projecting from said housing adapted to be frictionally engaged by said moving object for rotation of said roll thereby, a secondary roll, means journalling said secondary roll within said housing and means normally biasing said secondary roll journal means in a direction opposite to normal direction of rotation of said primary roll, a pressure plate slidably mounted within said housing for reciprocal travel towards and away from the peripheral surface of said primary roll, means for biasing said pressure plate against said secondary roll in a direction opposite to the normal direction of rotation of said primary roll, said pressure plate having a bevelled surface adapted to receive said secondary roll in wedging engagement between said pressure plate and said primary roll, whereby rotation of said primary roll in the direction of travel of an object thereon rotates said secondary roll in the opposite direction for frictional engagement with said pressure plate bevelled surface and wedging of the secondary roll between said primary roll and said pressure plate bevelled surface for retarding the rotation of said primary roll.

2. A braking device as claimed in claim 1 wherein said means journalling said secondary roll includes bracket means pivotally mounted on said primary roll journal means and said secondary roll journalled in said bracket means whereby said secondary roll can revolve about the periphery of said primary roll.

3. A braking device as claimed in claim 2 wherein said secondary roll is loosely journalled in said bracket means whereby said secondary roll can pivot about said primary roll into and out of frictional engagement with said primary roll.

4. A braking device as claimed in claim 3, said means for journalling said primary roll within said housing comprising a shaft extending axially through said primary roll and mounted in sidewalls of said housing, and spacers mounted on said shaft on each side of said primary roll for centering said primary roll within said housing.

5. A braking device as claimed in claim 4, said bracket means comprising a web and a pair of spaced sidewalls depending therefrom adapted to receive said primary roll therebetween, each said sidewall having an aperture formed therein for receiving said primary roll support shaft whereby said bracket means can pivot about said shaft, and each said sidewall having an aperture formed therein for receiving said secondary roll, whereby said secondary roll can rotate within said bracket in an arc about the periphery of said primary roll.

6. A braking device as claimed in claim 5, said bracket biasing means comprising tension springs secured to the said bracket and to the said housing.

7. A braking device as claimed in claim 2, means for restraining said pressure plate for linear reciprocal travel within the housing.

8. A braking device as claimed in claim 7, means for restricting the linear travel of said pressure plate whereby said secondary roll will be biased to normally loosely abut said primary roll.

9. A braking device as claimed in claim 8, detent means formed in said pressure plate and screw means adjustably threaded in said housing for adjusting retraction of linear travel of said pressure plate whereby the loose abutment of said secondary roll against said primary roll can be controlled.

10. A braking device as claimed in claim 9, said restraining means for maintaining said pressure plate in linear travel comprising a rod extending across said housing and secured to the housing sidewalls defining a space between the bottom of the housing in which said pressure plate is free to travel.

11. A braking device as claimed in claim 10, said pressure plate biasing means comprising a tension spring secured to the pressure plate and to the housing.

12. A braking device as claimed in claim 11, said primary roll and said secondary roll having a surface coating of a resilient material having the characteristics of urethane for frictional engagement therebetween.

13. The braking device as claimed in claim 1 in combination with an inclined roller conveyor having a plurality of idler rolls wherein said braking device is mounted sequentially with said rolls.

* * * * *